United States Patent [19]

McCarthy et al.

[11] Patent Number: 4,689,834
[45] Date of Patent: Sep. 1, 1987

[54] NIGHT VISION GOGGLE ARRANGEMENT WITH AUTOMATIC RELEASE

[76] Inventors: Brian D. McCarthy; Michael Edwards, both of MS Instruments Limited, Electron House, 33-49 Farwig Lane, Bromley, Kent BR1 3RE, England

[21] Appl. No.: 837,154

[22] Filed: Mar. 7, 1986

[51] Int. Cl.⁴ .......................... A42B 3/00; A61F 9/02
[52] U.S. Cl. .................................. 2/422; 2/424; 2/6; 350/549
[58] Field of Search ............... 2/422, 423, 424, 410, 2/6, 8, 9; 350/547, 548, 549, 538, 145

[56] References Cited

U.S. PATENT DOCUMENTS

| | | | |
|---|---|---|---|
| 4,156,292 | 5/1979 | Helm | 2/6 |
| 4,449,787 | 5/1984 | Burbo et al. | 350/549 X |
| 4,546,498 | 10/1985 | Fantin | 2/8 X |
| 4,563,061 | 1/1986 | Ellis | 350/547 X |
| 4,592,096 | 6/1986 | Glasheen | 350/547 X |

FOREIGN PATENT DOCUMENTS 2100466 12/1982 United Kingdom .
2107173 4/1983 United Kingdom .

*Primary Examiner*—Peter Nerbun
*Attorney, Agent, or Firm*—Laubscher & Laubscher

[57] ABSTRACT

A night vision goggle arrangement includes an assembly for adjusting the position of the goggles relative to a user, means for engaging the assembly with a mounting plate on a helmet, means for locking the assembly to the mounting plate, and release means arranged to unlock and disengage the assembly from the mounting plate.

7 Claims, 7 Drawing Figures

NIGHT VISION GOGGLE ARRANGEMENT WITH AUTOMATIC RELEASE

BACKGROUND OF THE INVENTION

The present invention is concerned with a night vision goggle arrangement. In one embodiment of the invention to be described there are provided means for attaching the goggles to the helmet of a pilot or other crew member of an aircraft and for releasing the goggles from the helmet.

In another embodiment of the invention to be described, night vision goggles are described which are adjustable.

BRIEF DESCRIPTION OF THE FIGURES

Embodiments of the invention will now be described, by way of example, with reference to the accompanying drawings in which.

DETAILED DESCRIPTION

Figure 1:
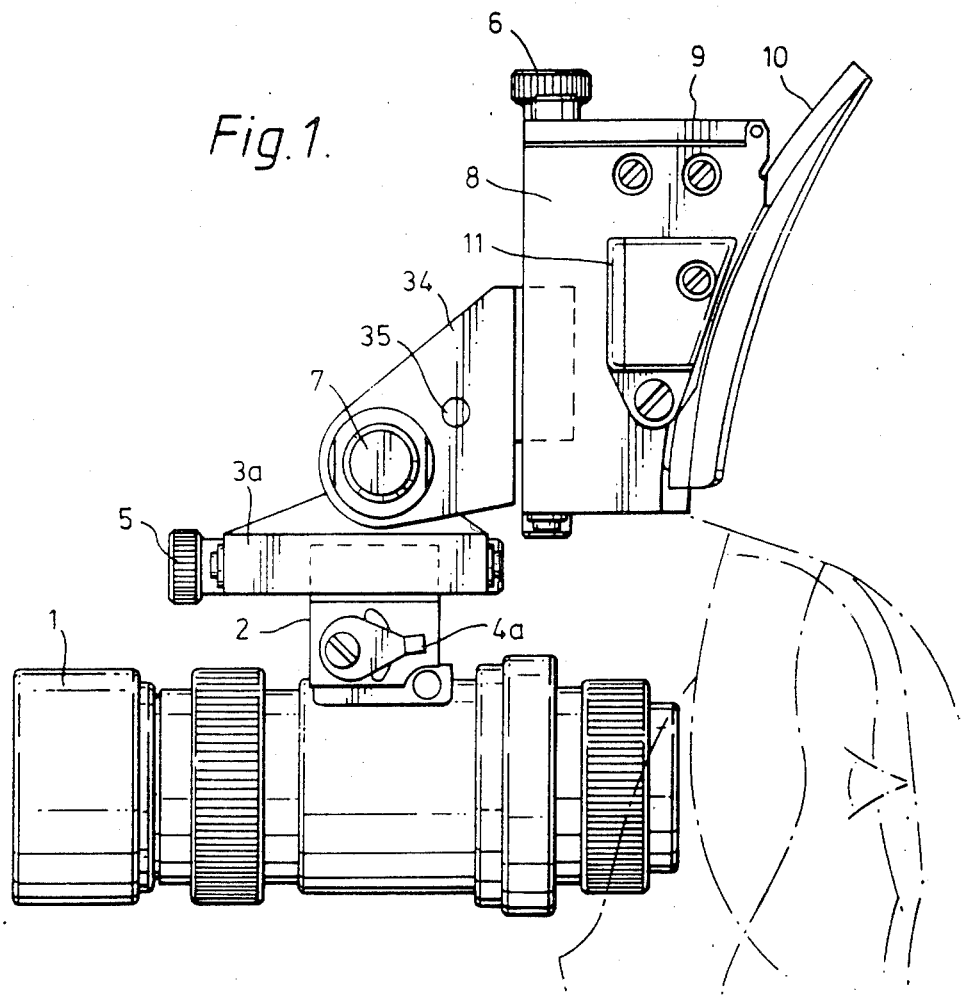
FIG. 1 is a side elevation of a goggles and a bracket.
Figure 1A:
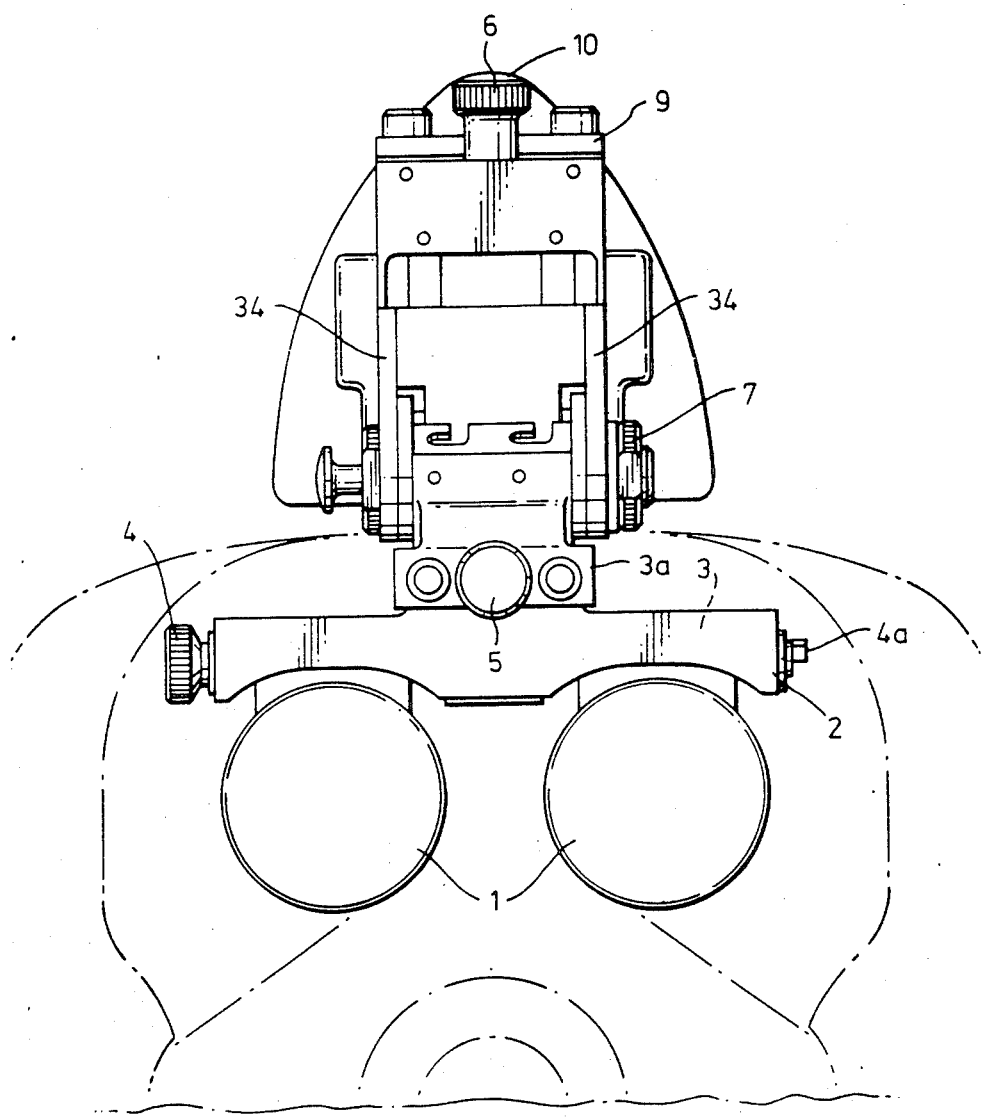
FIG. 1a is an end elevation of the arrangement shown in FIG. 1.

The bracket arrangement shown in FIGS. 1 and 1a includes two night vision goggles 1 attached by way of an attachment member 2 to a cross piece 3. The cross piece 3 incorporates an assembly containing a lead screw having a right hand thread extending from one end towards its center and a left hand thread extending from its other end towards its center. One of the goggles is mounted for sideways movement upon the left hand threaded portion and the other is mounted for sideways movement upon the right hand threaded portion of the lead screw. The lead screw terminates at one end in a knurled knob 4, the rotation of which in one direction or the other moves the mounting members together or apart laterally, thus allowing the interocular distance to be adjusted for a given user. The goggles may be tilted in the vertical plane about their longitudinal axes by the movement of a tilt adjustment lever 4a. The attachment member 2 may be moved backwards and forwards horizontally by rotating a knurled knob 5 arranged at one end of a further lead screw in order to allow the goggles to be adjusted to provide the correct eye relief for a particular user. The cross piece 3 and its assembly may be moved up or down vertically by the adjustment of yet another lead screw 6, in order to allow the optical center of the goggles to be set for a particular user. The cross piece 3 and its assembly may also be rotated around a locking pin 7 thus allowing the goggles to be rotated up and out of the field of view in order to provide an unobstructed field of view with the unaided eye. The locking pin 7 cooperates with means to lock the goggles in the raised position or in the lowered position. The vertical adjustment lead screw 6 is housed in a member 8 containing a locking mechanism by means of which the arrangement may be attached to a helmet mounting plate 10. The member 8 also contains beneath a lid 9 a battery power supply for the goggles. The complete bracket assembly can be separated from and removed from the helmet mounting plate 10, either manually by pulling release tabs 11 forward, or automatically by electrically operating a gas motor 12 in the way to be described below.

Figure 2:
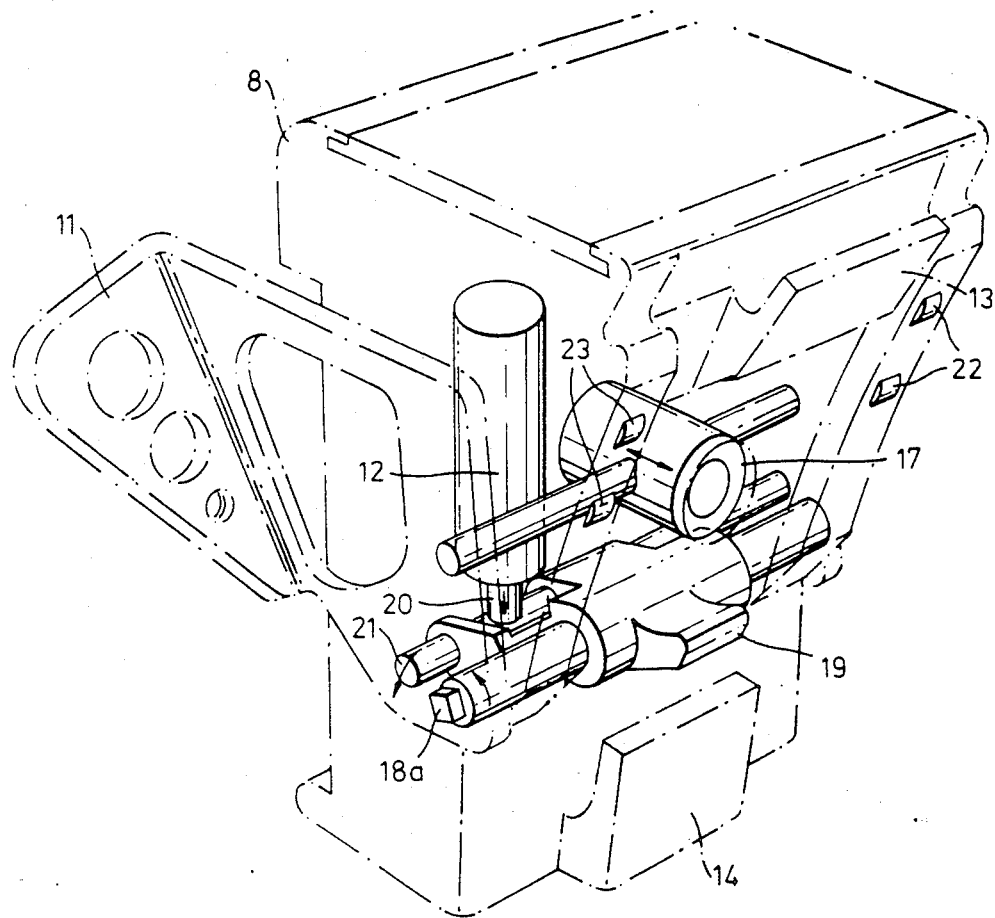
FIG. 2 is a perspective view of a release mechanism shown in relation to the bracket.
Figure 3:
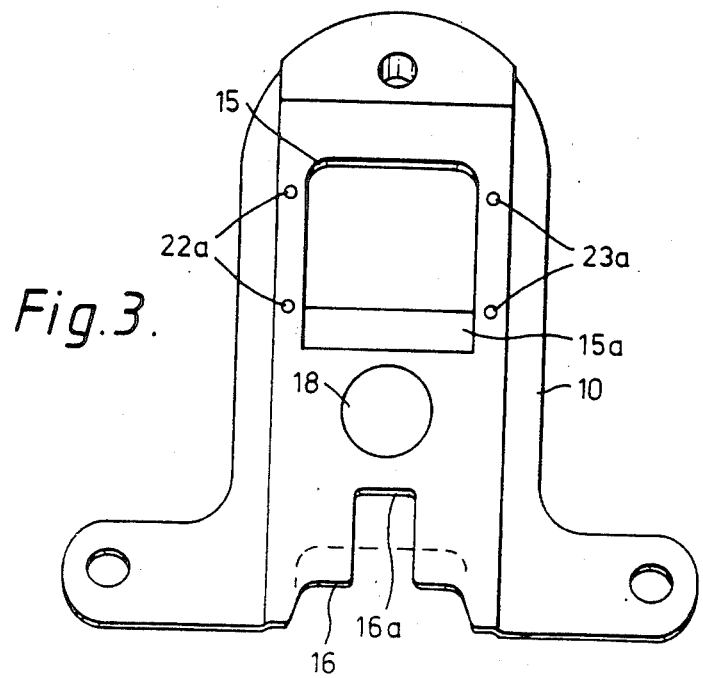
FIG. 3 shows a helmet mounting plate.

With reference to FIG. 2, which illustrates the bracket release mechanism, there are shown a tongue 13 and a latch 14 for engagement in the helmet mounting plate 10, which is best seen in FIG. 3. The tongue 13 is slid in and under an aperture 15 and the latch 14 engages under an aperture 16. A locking pin 17 may be withdrawn into the member 8 by manually pulling the release tabs 11 forward and in this position the tongue 13 and latch 14 can be disengaged from the helmet mounting plate 10. While the tabs 11 are released, the pressure provided by a spring (not shown) pushes the locking pin 17 forward allowing the locking pin 17 to engage with a hole 18. In this position the tongue 13 and the latch 14 are held in place and the assembly will remain locked on to the helmet mounting plate 10. The pair of release tabs 11, one of which is mounted on each side of the member 8, are rotatable around a shaft 18a which carries an ejection shoe 19. The ejection shoe 19 is raised as the release tabs 11 are pulled forwards and it makes contact with the top of the aperture 16 at 16a forcing the withdrawal of the tongue 13 and the latch 14 from the helmet mounting plate 10.

Figure 4:
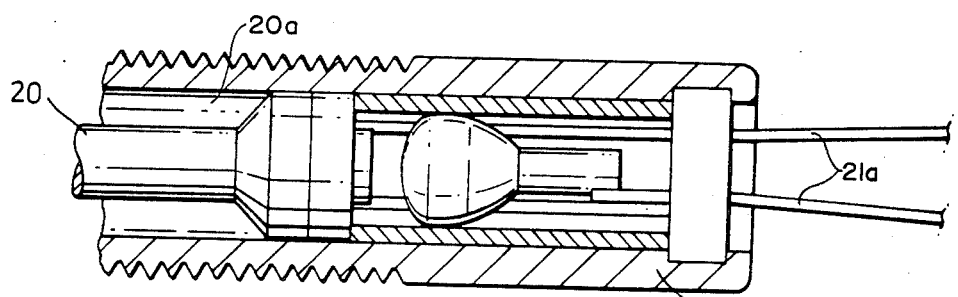
FIG. 4 is a longitudinal section through a gas motor used with the release mechanism.

The gas motor 12, as may be seen in FIG. 4, has an extended plunger 20 and incorporates a combustion chamber 20a containing a small quantity of a chemical substance. The motor 12 is a single-shot actuator which is fired electrically by means of an electric current passed via leads 21a to a fuse which ignites the chemical substance. The result of the combustion of the chemical substance is a gas which rapidly drives the plunger 20 down the length of the chamber 20a.

The gas motor 12 is shown in FIG. 2 mounted in the fired position in which the extended plunger 20 is in contact with a shaft 21 which extends from the rear of the ejection shoe 19. The shaft 21 is not constrained at each end and can move in an arc of a circle when the release tabs 11 are pulled forward. Under normal circumstances, i.e. when the gas motor has not been fired, the plunger 20 is contained within the gas motor body and the shaft 21 can move in a free arc. When the gas motor 12 is fired, the plunger 20 drives the shaft 21 downwards and locks it in position. This has the same effect as pulling the release tabs 11 forward manually and in each case the bracket assembly is ejected from the helmet mounting plate 10. A ramp at the lower end of tongue 13 strikes a ramp 15a in the aperture 15 on the helmet mounting plate imparting horizontal motion to the member 8 on ejection.

Figure 5:
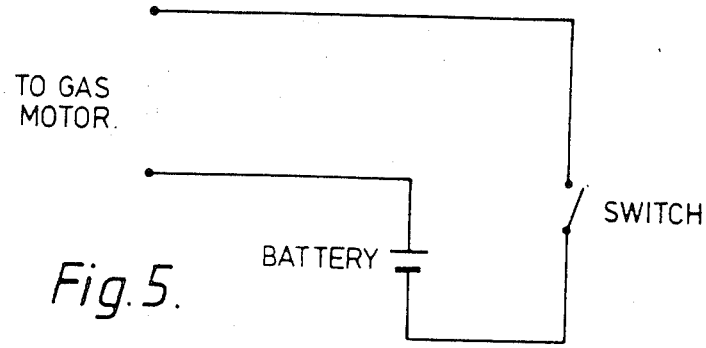
FIG. 5 is the electric firing circuit for the gas motor shown in FIG. 4.

The gas motor firing circuit is shown in FIG. 5 and is contained in an enclosure (not shown) mounted at a convenient place on a pilot's ejection seat. The electrical source of power is a lithium battery, one electrode of which is joined to one terminal of the gas motor via one lead 21a and the other electrode is connected to the other terminal of the gas motor by way of a switch and the other lead 21a. The body of the switch is retained by the enclosure and will move with the ejection seat. The switch-operating member is connected by a bracket to a fixed part of the aircraft in such a manner that as the ejection seat starts to move upward the switch operates and electrical contact is made. When the circuit is completed the gas motor 12 fires and automatically disengages the bracket assembly from the mounting plate 10, as described above. Electrical connections to the gas motor 12 are made by way of a pair of electrical contacts 22 which mate with corresponding contacts 22a (FIG. 3) on the helmet mounting plate 10. These contacts 22a in turn are connected to wires which run inside a helmet to a pigtail connector on the rear of the helment. The same connector carries the audio signals to the earphones and from the microphone. The goggles require electrical power of typically 3 volts at 50 mA to operate. Provision is also made to supply power to the goggles from a voltage reduction unit supplied by aircraft power or 28 v d.c. or 115 v a.c. 400 Hz. Normally the goggles use internal batteries but a change-over switch located in member 8 allows the external source of power to be selected.

An external source of power is also supplied by way of a pair of electrical contacts 23 (FIG. 2) on the bracket assembly which are connected by means of contacts 23a to the pigtail connector, in a similar way to that in which the connection is made via contacts 22 and 22a.

Figure 6:
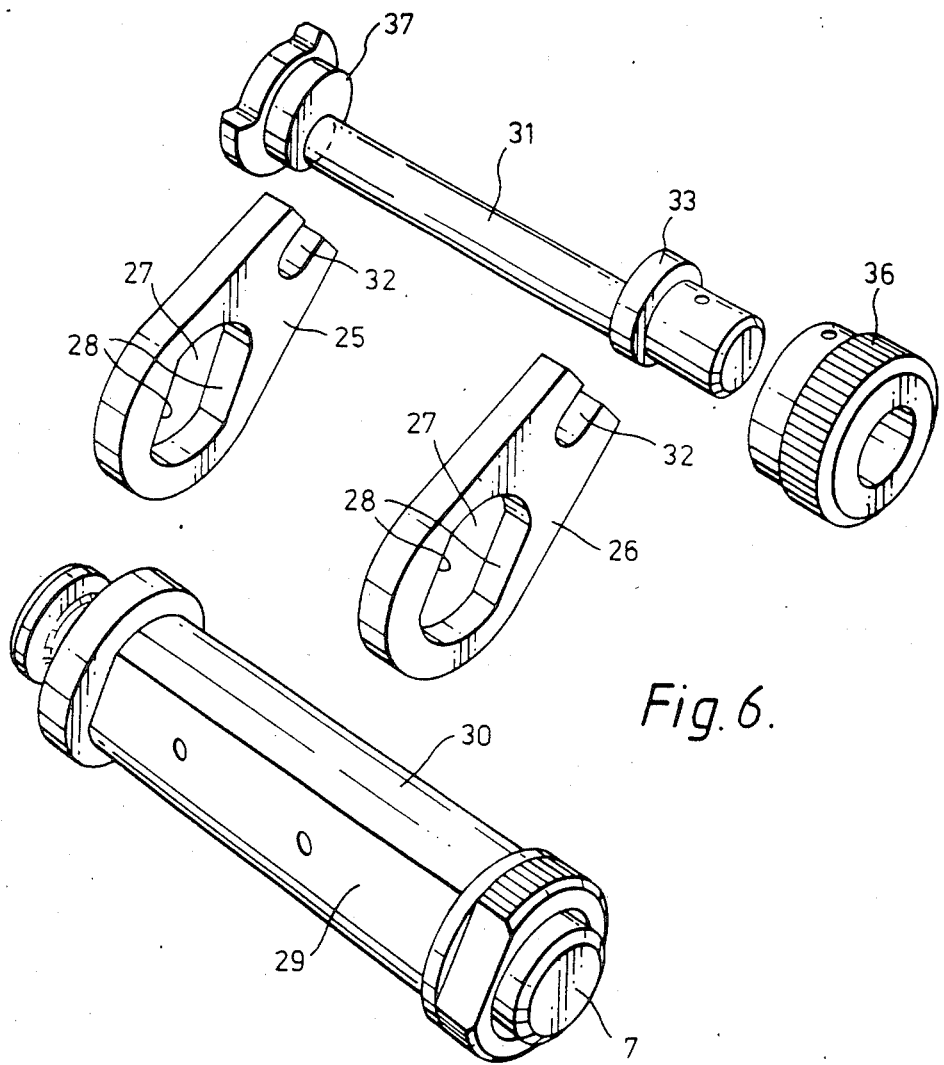
FIG. 6 is an exploded perspective view of a part of an alternative form of tilt mechanism.

Referring to FIG. 6, there is shown a part of an alternative tilt mechanism which includes a pair of plates 25 and 26, each plate incorporating holes 27 with flat opposing sides 28. The plates 25 and 26 slide over a member 30 which is arranged about locking pin 7. The member 30 has flat opposing sides 29 co-operating with the sides 28 of the holes 27, so that any rotation of the plates 25 and 26 causes the member 30 to be rotated about its longitudinal axis. Rotation of the member 30 tilts the goggles in the vertical plane about their longitudinal axes, in a way similar to that in which the goggles are tilted by the rotation of the lever 4a in the arrangement shown in FIG. 1.

However, in the modified arrangement of FIG. 6, the rotation of the member 30 by the plates 25 and 26 is achieved by means of a shaft 31 which locates in slots 32 in the plates 25 and 26. The shaft 31 is eccentrically mounted on bearing members 37 and 33 which are located in the flange portions of a bracket 34 (FIGS. 1 and 1A) and are rotatable about axis 35 (FIG. 1). The shaft 31 and the bearing members 37 and 33 are rotatable by means of a knob 36 attached to an extension of the member 33. Rotation of the knob 36 causes rotation of the eccentrically positioned shaft 31 to occur and thus rotation of the plates 25 and 26, to which it is coupled via the slots 32, and of the member 30. Rotation of the member 30 results in rotation of the cross piece 3 and thus tilting of the goggles.

It will be appreciated that, although the invention has been described, by way of example, with reference to the accompanying drawings, variations and modifications may be made within the scope of the invention.

We claim:

1. A night vision goggle arrangement for a helmet, comprising
   (a) an adjustable assembly connected with the goggles for adjusting the position of the goggles relative to a user;
   (b) means for connecting said assembly with a mounting plate on the helmet;
   (c) means for locking said assembly to the helmet mounting plate;
   (d) means for releasing said assembly from the helmet mounting plate; and
   (e) stored energy means for disengaging and ejecting said assembly from the helmet mounting plate.

2. Apparatus as defined in claim 1, wherein said release means includes
   (1) a manually operable rotatable lever for unlocking said locking means; and
   (2) ejection means for disconnecting said connecting means, thereby enabling said assembly to be ejected from the helmet mounting plate.

3. Apparatus as defined in claim 1, wherein said stored energy means comprises a gas motor, and further comprising electrically operable means for actuating said gas motor to eject said assembly from the helmet mounting plate.

4. Apparatus as defined in claim 1, wherein said assembly includes means for tilting the goggles relative to a user, said tilting means including
   (1) a rotatable eccentrically mounted shaft; and
   (2) coupling means connecting said shaft with the goggles, whereby rotation of said shaft causes corresponding tilting of the goggles relative to said assembly.

5. Apparatus as defined in claim 2, wherein the helmet mounting plate contains a pair of apertures and further wherein said connecting means comprises a pair of integral flanges extending from said assembly which are inserted into the pair of mounting plate apertures, respectively.

6. Apparatus as defined in claim 5, wherein the helmet mounting plate further contains an opening, and further wherein said assembly locking means comprises a pin connected with said rotatable lever, whereby when said lever is rotated to its locked position, said pin is projected into the mounting plate opening, and when said lever is rotated to its release position, said pin is removed from the mounting plate opening.

7. Apparatus as defined in claim 5, wherein said ejection means comprises an ejection shoe operable upon rotation of said lever to force said flanges out of the mounting plate apertures.

* * * * *